(12) United States Patent
Schindhelm et al.

(10) Patent No.: US 11,440,135 B2
(45) Date of Patent: Sep. 13, 2022

(54) LASER MACHINING NOZZLE FOR A LASER MACHINING DEVICE, AND LASER MACHINING DEVICE

(71) Applicant: TRUMPF Werkzeugmaschinen GmbH + Co. KG, Ditzingen (DE)

(72) Inventors: David Schindhelm, Stuttgart (DE); Christian Greger, Stuttgart (DE); Boris Regaard, Gerlingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 128 days.

(21) Appl. No.: 16/171,871

(22) Filed: Oct. 26, 2018

(65) Prior Publication Data

US 2019/0061051 A1     Feb. 28, 2019

Related U.S. Application Data

(63) Continuation-in-part of application No. 14/949,600, filed on Nov. 23, 2015, now abandoned, which is a continuation of application No. PCT/EP2013/001519, filed on May 23, 2013.

(51) Int. Cl.
*B23K 26/03* (2006.01)
*B23K 26/14* (2014.01)

(52) U.S. Cl.
CPC ........ *B23K 26/032* (2013.01); *B23K 26/1476* (2013.01)

(58) Field of Classification Search
CPC .............. B23K 26/032; B23K 26/1476; B23K 26/1462; B23K 26/1488

USPC .............. 219/121.83, 121.6, 121.61, 121.63, 219/121.64
See application file for complete search history.

(56) References Cited

U.S. PATENT DOCUMENTS

| | | |
|---|---|---|
| 3,423,593 A | 1/1969 | Chinnock |
| 5,463,202 A | 10/1995 | Kurosawa et al. |
| 5,618,456 A * | 4/1997 | Kim ........................ C23C 22/63 |
| | | 219/137.61 |
| 8,890,023 B2 | 11/2014 | Dorsch et al. |

(Continued)

FOREIGN PATENT DOCUMENTS

| | | |
|---|---|---|
| CN | 1874084 | 12/2006 |
| CN | 102990224 | 3/2013 |

(Continued)

OTHER PUBLICATIONS

Machine translation of DE 102007048471 performed on Nov. 4, 2021.*

(Continued)

*Primary Examiner* — Tu B Hoang
*Assistant Examiner* — Alba T Rosario-Aponte
(74) *Attorney, Agent, or Firm* — Fish & Richardson P.C.

(57) ABSTRACT

Described is laser machining nozzles for laser machining devices. The laser machining nozzles includes a body having an inner surface and an outer surface. The inner surface of the laser machining nozzles include at least one subarea. The subarea includes a layer of at least one of the copper oxides CuO and $Cu_2O$. The layer of CuO and/or $Cu_2O$ has an absorbing effect for radiation at an observation wavelength between 300 and 1100 nm or between 900 and 1700 nm.

8 Claims, 3 Drawing Sheets

(56) References Cited

U.S. PATENT DOCUMENTS

| | | | | |
|---|---|---|---|---|
| 2009/0092823 A1* | 4/2009 | Webb | ............... | B23K 1/0008 |
| | | | | 428/323 |
| 2011/0180184 A1* | 7/2011 | Lutz | ............... | C22F 1/186 |
| | | | | 148/241 |
| 2013/0319980 A1* | 12/2013 | Hesse | ............... | B23K 31/125 |
| | | | | 219/121.62 |
| 2016/0074961 A1* | 3/2016 | Schindhelm | ....... | B23K 26/1462 |
| | | | | 219/121.83 |

FOREIGN PATENT DOCUMENTS

| | | | | | |
|---|---|---|---|---|---|
| CN | 104232838 | A | * | 12/2014 | |
| DE | 2450925 | | | 12/1982 | |
| DE | 3212314 | | | 10/1983 | |
| DE | 227364 | | | 9/1985 | |
| DE | 102007048471 | | | 4/2009 | |
| DE | 102007048471 | A | * | 4/2009 | ........... B23K 26/042 |
| DE | 102011003717 | | | 8/2012 | |
| GB | 1439770 | | | 6/1976 | |
| JP | 01234515 | | | 9/1989 | |
| WO | WO 9956907 | | | 11/1999 | |
| WO | WO 2012/107331 | | | 8/2012 | |

OTHER PUBLICATIONS

International Search Report from corresponding PCT Application No. PCT/EP2013/001519, dated Mar. 12, 2014, 4 pages.
Office Action in Chinese Application No. 201380078437.0, dated Oct. 19, 2017, 20 pages (with English translation).

* cited by examiner

LASER MACHINING NOZZLE FOR A LASER MACHINING DEVICE, AND LASER MACHINING DEVICE

CROSS-REFERENCE TO RELATED APPLICATIONS

This application is a continuation-in-part of and claims priority under 35 U.S.C. § 120 to U.S. application Ser. No. 14/949,600, filed on Nov. 23, 2015, which is a continuation of PCT Application No. PCT/EP2013/001519 filed on May 23, 2013. The contents of these priority applications are hereby incorporated by reference in their entireties.

TECHNICAL FIELD

The invention relates to a laser machining nozzle for a laser machining device.

BACKGROUND

Despite enormous advances in the control of laser machining processes, it is possible for defective machining results to occur even on modern laser machining systems. To detect defective processes as early as possible during laser machining to be able to take possible remedial actions, it is known to monitor the process zone optically.

One example of a detection device on a CO2 laser cutting system, in which detection of the process light is carried out through a laser machining nozzle, is described by DE 10 2011 003 717 A1. The radiation emitted or reflected from the process zone is coupled out by means of a partially transparent deflection mirror. The incident CO2 laser light is reflected by the deflection mirror. On the other hand, the radiation from the process zone, in a wavelength range from 550 to 2000 nm, is able to pass through the deflection mirror. After the process light has passed through the partially transparent deflection mirror, it is finally fed via further optical elements to a high-resolution camera. The camera detects the radiation at an observation wavelength, e.g., in the visible or near infrared wavelength range. The recordings from the camera can be used for process monitoring and/or control.

DE 24 50 925 A1 discloses a laser device having a gas nozzle to which a cooling system is fitted. To monitor the alignment of a laser beam relative to the gas nozzle, the heat absorbed by the gas nozzle is determined by means of a temperature measurement of the cooling water. The sensitivity of the measuring device is increased by a heat-absorbing layer on the inner surface of the gas nozzle.

DE 32 12 314 A1 describes an inert-gas nozzle of an inert-gas welding burner, which is provided with a black nickel layer to extend service life.

SUMMARY

Various aspects of the invention relate to laser machining nozzles for a laser machining device and to methods for using such a laser machining nozzle on the laser machining device. According to one aspect, the laser machining device includes a detection device for detecting radiation from a process zone defined by the laser machining nozzle for process monitoring.

As described herein, a distinction is made between an off-axis, quasi-coaxial and coaxial output coupling of the process radiation based on how the optical sensors of particular detection devices are arranged. In the case of off-axis output coupling, the radiation from the machining process is observed from a detection direction that extends at an angle of greater than 10° with respect to the laser beam axis. In the case of quasi-coaxial output coupling, the detection direction extends at an angle of less than 10° with respect to the laser beam axis. Coaxial output coupling as described in the present application references when the detection direction extends parallel to the laser beam axis. In particular, for the last variant, detection of the process light through the laser machining nozzle has advantageously been implemented in particular embodiments, since from this direction the process zone can be viewed in a particularly unimpeded manner.

An object of the invention is to improve the signal quality of the detected radiation from the process zone at at least one observation wavelength.

According to various embodiments of the invention, the laser machining nozzle includes a body having an inner surface and an outer surface. The inner surface of the laser machining nozzle includes at least one subarea. The subarea includes a layer of at least one of the copper oxides CuO and $Cu_2O$. The layer of CuO and/or $Cu_2O$ has an absorbing effect for radiation at an observation wavelength between 300 and 1100 nm or between 900 and 1700 nm.

In some implementations, the subarea has a surface roughness RZ of more than 5 μm.

In certain implementations, the body comprises copper.

The subarea can be produced by laser marking or by chemical etching.

In various implementations, the body is a one-piece component.

In some implementations, the subarea surrounds a nozzle opening of the laser machining nozzle.

In certain implementations, the subarea directly adjoins a nozzle opening of the laser machining nozzle.

In certain implementations, the subarea of the laser machining nozzle provides a contrast section, which has an absorbing effect at least for radiation or light at an observation wavelength suitable for process monitoring by a detection device. The contrast section (subarea) may also have a scattering effect for radiation or light at the observation wavelength. A suitable observation wavelength is a wavelength at which monitoring of a laser machining process by means of a detection device permits conclusions to be drawn about the machining process. In particular, therefore, a possible observation wavelength lies in the range between 300 to 3000 nm, which covers both the visible and the near infrared spectral range.

An optical detector, a sensor or an image acquisition device of the detection device does not just detect radiation at exactly one wavelength. Instead—depending on the type of detector and filters that may possibly be connected upstream—as a rule a narrow wavelength range at or near an observation wavelength is detected.

In any case, both a scattering and an absorbing effect on the radiation originating from the process zone at an observation wavelength ensures that the radiation that strikes the nozzle in the contrast section (subarea) can be reflected to a substantially lower extent toward the detection device. An occurrence of parasitic reflections is reduced. Because of the inventive optical properties of the contrast section (subarea), the image of the contrast section (subarea) can be distinguished very well from the image of the process zone in the recordings of the detection device.

The scattering effect of the contrast section (subarea) can be achieved, for example, by means of surface structuring. Instead of a smooth metallic surface, the surface of the nozzle, at least in the area of the contrast section (subarea), has a roughness such that the radiation at the observation wavelength is scattered. When the subarea is formed by laser marking of a copper nozzle body, the copper in the subarea is re-melted during laser marking. The laser marking causes both a chemical reaction of the molten copper material with the ambient air and changes the surface structure of the copper material, thereby increasing the surface roughness. In certain embodiments, the copper oxides are formed via chemical etching of the copper material of the subarea, which also increases surface roughness.

The "absorption" or "absorption coefficient" as discussed herein refer to the ratio of the intensity of the absorbed radiation to the intensity of the incident radiation at a surface, which is dependent on the angle of incidence. Accordingly, the absorption or absorption coefficient is a dimensionless value. Except in cases where a specific angle of incidence is given, the absorption generally refers to normal incidence, i.e., when the radiation impinges on the surface perpendicular to the surface. In general, an absorbing effect according to various embodiments of the invention results if the level of the absorption for radiation, at least at the observation wavelength, is greater than about 0.3. The level of the absorption for radiation, at least at the observation wavelength, can be at a value greater than about 0.5, greater than about 0.7, or even greater than about 0.9. The occurrence of parasitic reflections at the contrast section (subarea) is effectively stopped in this way.

In some embodiments, at least at the observation wavelength, the contrast section (subarea) has a reflectivity which differs from, and can be lower than, the reflectivity of the surface of the workpiece, which is likewise covered by the detection device. In particular, the difference in reflectivity has a value of at least about 0.1, at least about 0.3, or even at least about 0.5. By virtue of this measure, the result in the recording of the detection device is a high contrast between the part of the nozzle that is imaged and the workpiece surface that is imaged. In the case of detection through the nozzle, it is thus possible, for example, for the diameter of the nozzle opening facing the process to be checked reliably and/or measured very accurately.

Very frequently, laser machining devices are used for machining structural and/or stainless steel, for example. Therefore, in particular embodiments the contrast section (subarea) of the nozzle has a reflectivity for radiation at the observation wavelength, which differs from the reflectivity of the surface of structural steel and/or stainless steel. The reflectivity or reflection coefficient as discussed herein refers to the ratio of the intensity of the reflected radiation to the intensity of the incident radiation at a surface and is dependent on the angle of incidence. Accordingly, the reflectivity or reflection coefficient is a dimensionless value. In a manner similar to absorption, except in cases where a specific angle of incidence is given, the reflectivity generally refers to normal incidence, i.e., when the incident radiation is perpendicular to the surface. In this case, the reflectivity is dependent only on the refractive index of the material/medium at the surface and the refractive index of the ambient medium (e.g., air). In particular embodiments, the contrast section (subarea) of the nozzle has a reflectivity for radiation at the observation wavelength, which differs from the reflectivity of the surface of structural steel and/or stainless steel by at least about 0.1, at least about 0.3, or even at least about 0.5, and in particular is lower than the reflectivity by these values.

In certain embodiments, the contrast section (subarea) of the nozzle is configured in such a way that, as compared with a nozzle without a contrast section (subarea), a lower proportion of the radiation, at least at the observation wavelength, can reach the detection device as a result of reflection at the nozzle surface. In particular, this is achieved by a reflectivity of the contrast section (subarea) having a reflectivity value according to one or more particular embodiments described herein, with regard to the detection area of the detection device.

Particularly effectively, the signal quality of the radiation originating from the process zone and detected by a detection device is improved in the case of one example, in which the contrast section (subarea) is arranged on the nozzle surface in such a way that radiation from the process zone can strike the contrast section (subarea) directly.

Alternatively or additionally, the contrast section (subarea) can be arranged on the nozzle surface in such a way that the contrast section (subarea) can be arranged in the detection or recording area of a detection device for detecting radiation from a process zone defined by the laser nozzle. This is advantageous in particular when the detection device is not used or not only used for the direct observation of the immediate laser machining process, but is (also) used for process monitoring to such an extent that, by means of the detection device, for example the condition or the dimensions of the nozzle can be checked. On the basis of the contrast section (subarea) arranged in the recording area of the detection device, a measurement or check on the part of the mounted nozzle that is imaged can consequently be carried out by the detection device with higher accuracy and reliability during the laser machining.

This applies in particular to an arrangement of the contrast section (subarea) in which the radiation that comes from the process zone defined by the laser nozzle can strike the contrast section (subarea) directly and, as a result of a single reflection at the contrast section (subarea), can or could reach a detection device if it is not absorbed or scattered on the contrast section (subarea).

The laser beam and additional process gases can be fed to the process zone through the nozzle. For this purpose, it has a nozzle channel that extends between two nozzle openings. One nozzle opening faces the process zone, and the other nozzle opening faces away from the process zone.

In certain embodiments, the nozzle is configured in such a way that the radiation from the process zone can be detected by means of the detection device through the nozzle channel extending between two nozzle openings. Consequently, the nozzle is suitable for use on a laser machining device having coaxial or quasi-coaxial output coupling of the process light to be detected. In this case, the contrast section (subarea) can be arranged on the nozzle channel wall in such a way that it is visible from the nozzle opening that faces away from the process zone during operation. Consequently, the nozzle is formed in such a way that radiation that is emitted or reflected at the contrast section (subarea) can emerge from the nozzle counter to the detection direction (in the case of coaxial output coupling, parallel to the laser beam axis and to the course of the nozzle channel) through the nozzle opening facing away from the process, and can therefore reach the detection device. This results in particular if the contrast section (subarea) extends at an angle of inclination between 0° and 90° with respect to the course of the nozzle channel and/or the laser beam axis or the detection direction, at an angle of inclination between 0° and 45°, or at an angle of inclination of 5° to 15°.

In particular, the nozzle opening facing away from the process is larger than the opening width of the nozzle inner surface in the area of the contrast section (subarea), and, between the nozzle opening facing away from the process and the contrast section (subarea), there are no further features, including protrusions and recesses, present either which block the view (or a line of sight of a detection device) of the contrast section (subarea) in the detection direction. Thanks to this measure, the contrast section (subarea) is visible to a coaxial detection device and, on account of its contrast with respect to the process zone, for example increases the ability to evaluate the recording of the detection device.

The selection of the wavelength at which a detection device observes the process zone depends on various aspects. For example, it is decisive which defective processes are primarily intended to be detected. In general, however, radiation from the process zone also can be detected at various wavelengths on one and the same laser machining device. For this purpose, a plurality of separate detection devices can also be present.

First, it is possible to detect radiation reflected only in the process zone. Second, it is possible to detect radiation that arises in the process zone on account of the laser machining process and is emitted. The emitted process light, so-called process self-illumination, is particularly suitable for making observations about possible process aberrations in the process zone.

In a particular exemplary embodiment, the contrast section (subarea) has an absorbing effect for radiation at least at an observation wavelength between 300 and 2000 nm. In this wavelength range, the process self-illumination from laser machining of metals is particularly pronounced. The reason for this is the thermal illumination of the molten or evaporated metal in the process zone, which primarily occurs in this wavelength range, and also plasma illumination.

As a result of the absorbing effect of the contrast section (subarea), the occurrence of parasitic reflections of emitted process radiation, which is particularly highly suited for process monitoring, is accordingly reduced.

In certain embodiments, detection of the process self-illumination is carried out at a wavelength between 300 and 1100 nm, because highly suitable silicon-based detectors are available for this wavelength range. In some embodiments, the detection of a wavelength between 900 and 1700 nm is likewise preferred. For this wavelength range, for example, InGaAs-based detectors are highly suitable. Accordingly, the contrast section (subarea) can be configured to be absorbent at an observation wavelength between 300 and 1100 nm and/or between 900 and 1700 nm.

In certain variants, the contrast section (subarea) is absorbent to radiation at an observation wavelength, whereas radiation with a wavelength of greater than 2000 nm is not absorbed or absorbed only to a low extent by the contrast section (subarea).

Alternatively or additionally, disruptive influences on the laser nozzle by the laser beam from the laser machining device for which the laser nozzle is provided are reduced if the contrast section (subarea) does not act in an absorbing manner or acts only to a low extent at the wavelength of the laser beam. In particular, the contrast section (subarea) is consequently not absorbent or absorbent only to a low extent to radiation at a wavelength of about 10.6 μm and/or about 1.03 μm.

An absorbing effect to a low extent is present if the contrast section (subarea) has a level of absorption of less than about 0.5, in particular of less than about 0.3. No absorbing effect is present in particular if the level of absorption of the surface is less than about 0.1. Thanks to this measure, the contrast section (subarea) reflects a considerable part of the laser beam or the thermal radiation from the process zone, which is not needed for process monitoring. As a result, excessive heating of the nozzle is counteracted.

Laser machining nozzles usually constitute consumable parts. They have to be replaced repeatedly in the course of the service life of a laser machining device. In addition, they are normally specifically configured for the respective machining jobs. The nozzles according to the invention can be advantageously designed as replaceable nozzles. The nozzles can be made in one piece, e.g., made from a single material. In some embodiments, the nozzle is formed without any integrated water guide.

Advantageous in terms of production is a configuration of the laser machining nozzle as a substantially rotationally symmetrical component. Economical production as a turned part is made possible. In some embodiments, the laser machining nozzle can be provided with an external thread in the area of the nozzle opening facing away from the process so that the laser machining nozzle can be connected to a laser machining device.

In some embodiments, the contrast section (subarea) is at least partly arranged on a conical section of its inner surface or the nozzle channel wall. The contrast section (subarea) can thus be used to shape the process gas flow and is simultaneously easily visible in the detection direction. For example, the contrast section (subarea) can extend at an angle of inclination between 5° and 15° with respect to the course of the nozzle channel and/or the laser beam axis or detection direction.

In a particular embodiments of the invention, the contrast section (subarea) is arranged in such a way that, as viewed through the nozzle, the contrast section (subarea) surrounds the nozzle opening that faces the process zone during operation. Consequently, the contrast section (subarea) can be illustrated in the edge region of the image of the process zone that results in the detection device and can be used in a straightforward manner during the evaluation to measure the nozzle or possibly remain unconsidered. In particular, it is advantageous for the most complete possible suppression of parasitic reflections if the contrast section (subarea) surrounds the nozzle opening completely as seen in the viewing direction parallel to the course of the nozzle channel.

Alternatively or additionally, an arrangement that is advantageous for an evaluation of the detector recordings results if the contrast section (subarea), as viewed through the nozzle, directly adjoins the nozzle opening. For example, the diameter of the nozzle opening can be determined particularly accurately and reliably on account of the increased contrast between the contrast section (subarea) and the nozzle opening.

In this sense, it is advantageous if, in a development of the invention, in the case of a design of a nozzle in which the nozzle opening that faces the process adjoins a cylindrical section of the nozzle channel, the contrast section (subarea) is at least also arranged on this cylindrical section.

A design variant has proven particularly worthwhile in which the laser machining nozzle has a metallic base, the surface of which, at least in the contrast section (subarea), is modified by laser marking or chemical etching. A metallic base, in particular made of copper, exhibits good resistance to the thermal and mechanical stresses during the laser machining. In addition, a nozzle with a metallic base is suitable for use together with further sensors for laser machining devices such as, for example, capacitive distance sensors. In particular, the modified subarea exhibits a higher level of absorption than the unmodified material surface of the metallic base, at least at the observation wavelength.

According to a further aspect of the invention, a laser machining device has a nozzle with a contrast section (subarea) and a detection device for detecting radiation from a process zone defined by the nozzle at at least one observation wavelength, wherein the contrast region absorbs and/or scatters the radiation, at least at the observation wavelength. In certain embodiments, coaxial or at least quasi-coaxial observation of the process zone through the nozzle is carried out by the detection device.

In the case of a particular embodiment, the laser machining device has an illuminating apparatus by means of which at least the process zone defined by the nozzle can be illuminated. For example, the illuminating apparatus can illuminate the process zone laterally, i.e., not parallel to the laser beam axis. In this case, it is particularly advantageous if the contrast section (subarea) of the nozzle acts in an absorbing manner for the radiation of the illuminating apparatus at at least one wavelength, which at the same time corresponds to an observation wavelength of the detection device. Therefore, in particular, parasitic light or radiation reflections at the surface of the nozzle caused by the illuminating apparatus are reduced or even wholly prevented.

In certain embodiments, the process zone can be illuminated through the nozzle by means of the illuminating apparatus, i.e., the illumination is carried out coaxially or at least quasi-coaxially. Direct and unimpeded illumination of the process zone is ensured. Even in the case of the coaxial or quasi-coaxial arrangement of the illuminating apparatus, it is advantageous if the contrast section (subarea) has an absorbing effect on the radiation from the illuminating apparatus at a wavelength, which at the same time corresponds to an observation wavelength. A contrast section (subarea) that absorbs the radiation from the illuminating apparatus at at least one detected wavelength results in the illuminated contrast section (subarea) appearing darker and, as a result, the contrast with respect to the process zone is increased.

The surface of the workpiece that faces the nozzle is likewise illuminated by the illuminating apparatus and comes into the recording area of the detection device during the workpiece machining. In certain embodiments, the contrast section (subarea) of the nozzle has a reflectivity, at least for radiation from the illuminating apparatus at a wavelength that at the same time corresponds to an observation wavelength, which differs from the reflectivity of the workpiece surface, and in particular is lower than the latter. For example, the difference in reflectivity has a value of at least 0.1, at least 0.3 or even at least 0.5.

In particular, the contrast section (subarea) has a reflectivity coefficient for radiation from the illuminating apparatus at a wavelength that at the same time corresponds to an observation wavelength and that differs from the reflectivity coefficient of the surface of structural steel and/or stainless steel by a value of at least about 0.1, 0.3, or 0.5. The reflectivity coefficient for the contrast section (subarea) in such implementation can be lower than the reflectivity coefficient of the surface of structural steel and/or stainless steel by at least one of these values, 0.1, 0.3, and 0.5.

In a particular type of implementation of the laser machining device, an activation/deactivation unit is provided, by means of which process monitoring by the detection device can be activated and deactivated, depending on whether an installed nozzle has an expected contrast section (subarea) or not. In this way, it is ensured that the process monitoring is not carried out with a nozzle which, because of a lack of contrast section (subarea), cannot ensure an adequate quality of the signal from the detection device.

In this sense, according to a further aspect of the invention, in a method for implementing a nozzle on a laser machining device, after the nozzle has been fitted to the machining device, a detection device is used to check whether the surface of the nozzle has an expected contrast section (subarea) that is visible to the detection device in the detection direction and has an absorbing effect, at least for radiation at an observation wavelength of the detection device. For the case in which the result of the check on the nozzle is that the nozzle has no contrast section (subarea), process monitoring by the detection device is deactivated or even not activated at all for the following laser machining using the nozzle.

The invention will be explained below by using schematic drawings, which illustrate, but do not limit the inventions described herein.

DETAILED DESCRIPTION

Figure 1:
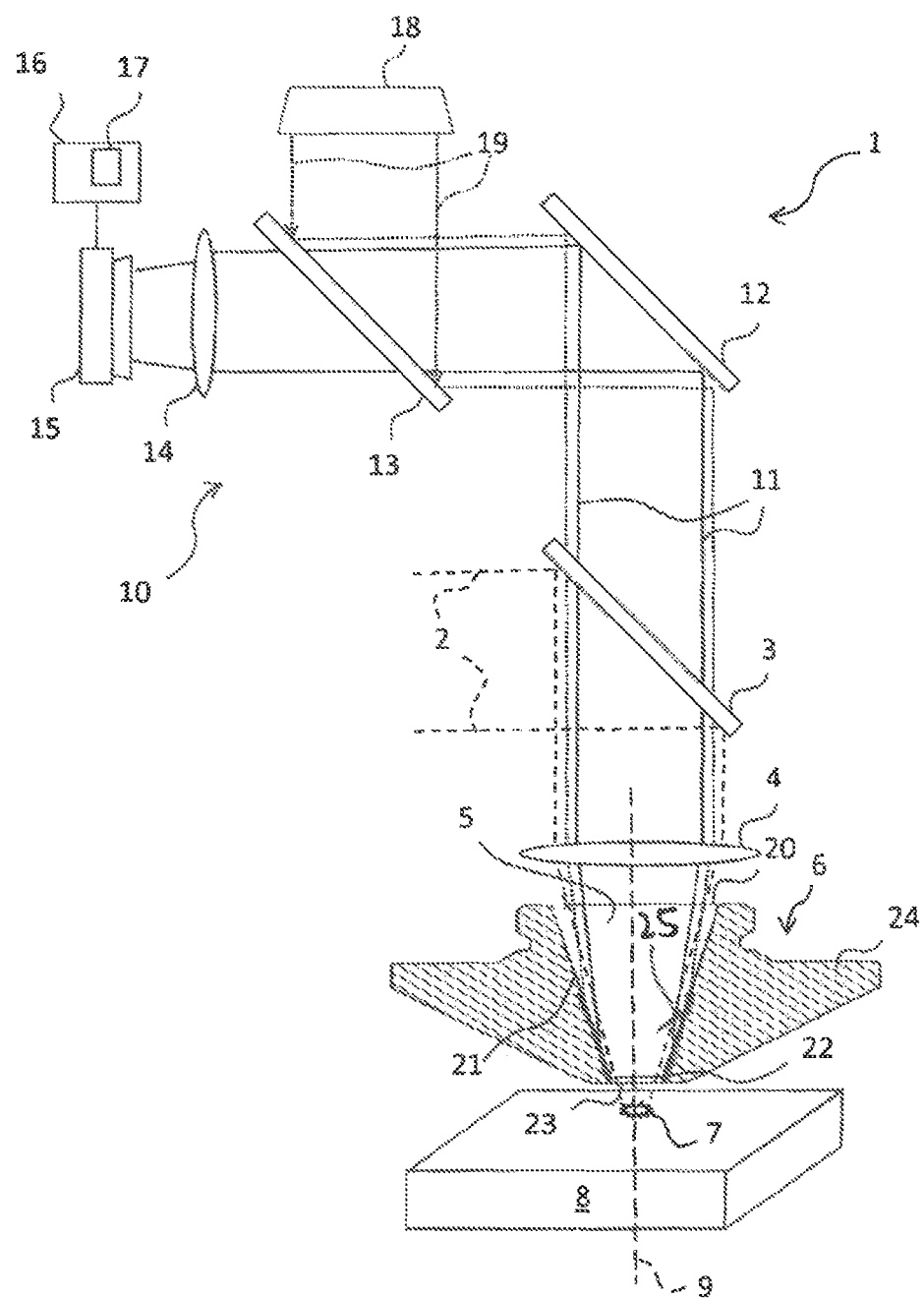
FIG. 1 shows a laser machining device having a laser machining nozzle and a detection device for the radiation from a process zone.

FIG. 1 shows a laser machining device 1, which can be used for laser cutting or welding of metal workpieces such as metal sheets. The laser machining device 1 is part of a laser machining system, which, for example, comprises a $CO_2$ laser or a solid state laser for generating a laser beam 2. The laser beam 2 is fed to the laser machining device 1 by means of a beam guide, not shown.

In the machining device 1, the laser beam 2 is deflected, for example at a partially transparent deflection mirror 3, and after passing through a focusing lens 4 and a nozzle channel 5 of a laser machining nozzle 6 strikes a workpiece 8 in a process zone 7. As it passes through the nozzle channel 5, the laser beam 2 extends along a laser beam axis 9. The nozzle 6 is fixed to a nozzle holder, which, for reasons of clarity, is not shown in the figures. In addition, further details of the machining device 1, such as for example a supply of process gases, which can be fed to the process zone 7 via the nozzle, are not illustrated in the figures for reasons of clarity.

The position of the process zone 7 on the workpiece 8 can be varied by means of a relative movement by means of movement devices, likewise not shown, between the laser beam 2 and the workpiece 8.

The laser machining device 1 has, as part of an apparatus for process monitoring or control, a detection device 10 for the detection of radiation that is reflected or emitted from or by the process zone 7.

By means of the detection device 10, the radiation from the process zone 7 can be detected through the nozzle 6 in a detection direction. The detection direction extends parallel to the laser beam axis 9 in the area of the nozzle 6 and from top to bottom in FIG. 1. The radiation from the process zone 7 is consequently coupled out coaxially. The course of the detected radiation is illustrated in FIG. 1 with the aid of continuous lines 11.

The output coupling is carried out via the partially transparent deflection mirror 3, which, for example, is transparent to radiation in a wavelength range 500 to 2000 nm, but reflects the laser light ($CO_2$: 10.6 μm, solid body: e.g., 1.03 μm). Alternatively, output coupling can also be carried out with the aid of a scraper, grooved, or perforated mirror. To deflect the radiation coupled out to an optical detector of the detection device 10, a further deflection mirror 12, a partially transparent deflection mirror 13, and a lens 14 are provided.

The optical detector or optical sensor can be a spatially-resolving near infrared camera 15, which, for example, is based on silicon as semiconductor material and is operated with an upstream band pass filter in the near infrared spectral range. To evaluate the camera recordings, an evaluation unit 16 is provided. Alternatively or in addition to the spatially-resolving camera 15, it is also possible to use another optical sensor that, for example, supplies intensity values integrated over the detected range.

The inner surface of the nozzle 6 or the nozzle channel wall, starting from a nozzle opening 20 facing away from the process, has a conical partial section 21. A short cylindrical partial section 22 extends between the conical section 21 and the nozzle opening 23 facing the process.

It can be seen from FIG. 1 that at least part of the inner surface of the nozzle 6 or the nozzle channel wall, starting from the nozzle opening 20 facing away from the process, is visible, in particular in the viewing direction parallel to the course of the nozzle channel 5, i.e., in the detection direction. The conical section 21 and the cylindrical section 22 of the nozzle channel wall comprise a contrast section 25 formed as a surface subarea on the conical section 21 of the nozzle 6. The contrast section 25 is modified in a way that, in comparison with the unmodified surface of the base (body) 24 of the nozzle 6, has an absorbing effect for radiation, at least at the observation wavelength. The modified surface of the subarea 25 includes one or more copper oxides, CuO and/or $Cu_2O$. In certain implementations, the copper oxide subarea is formed by laser marking of the copper body 24 in the subarea 25, thereby producing a micrometer range blackened layer on the surface of the nozzle 6 in the contrast section (subarea) 25. The laser marking can be used to change the surface roughness in the subarea of the conical section 21 of the nozzle 6. The copper in the subarea 25 is roughened and/or re-melted during laser marking. The copper material is melted and vaporized. The laser marking causes both a chemical reaction of the molten copper material with the ambient air and a change of the surface structure of the copper material. In certain embodiments, the copper oxides are formed via chemical etching of the copper material of the subarea 25 of the conical section 21 of the nozzle 6.

The copper oxides form a micrometer range blackened layer on the surface of the nozzle 6 in the contrast section (subarea) 25. Radiation, at least at the observation wavelength, which, starting from the process zone 7, strikes the contrast section (subarea) 25 directly, is prevented from being reflected there, at least to a significant extent. This is because the reflected radiation would reach the camera 15 via the focusing lens 4 and so on and have a negative influence on the signal quality of the process recordings.

The entire outer surface of the nozzle 6 is formed by copper. Therefore, the nozzle 6 is highly suitable for use with capacitive distance sensors, not shown.

Figure 2:
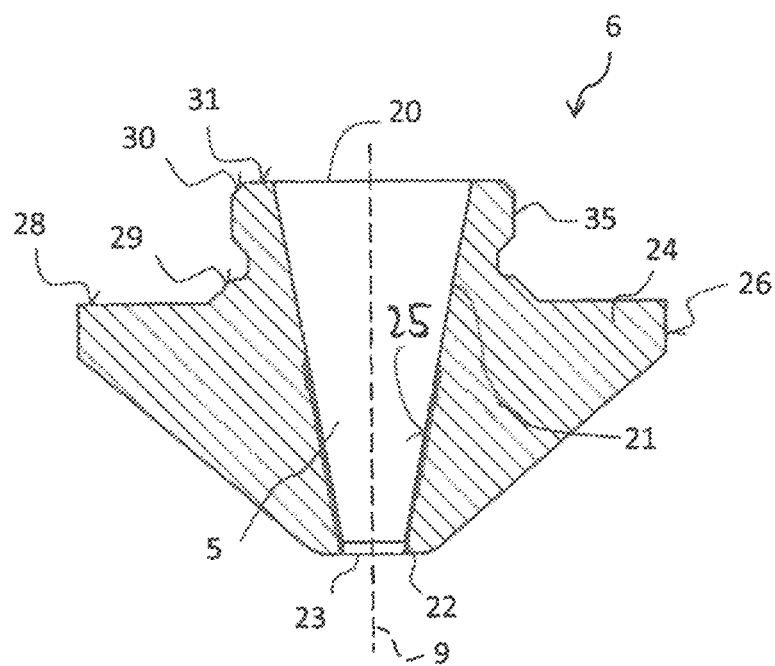
FIG. 2 shows the laser machining nozzle of the laser machining device from FIG. 1 in a central sectional view.

For the purpose of a clear illustration, the nozzle 6 is illustrated in a slightly distorted manner in FIG. 1. The nozzle 6 will therefore be described in more detail by using FIGS. 2 and 3, which show true-to-scale illustrations of the nozzle 6.

The nozzle 6 has a metallic base (nozzle body) 24 made of copper. The nozzle channel 5 led centrally through the base (body) 24 is formed rotationally symmetrically about the laser beam axis 9. In the area of the nozzle opening 20 that faces away from the process, an external thread 35, not shown in detail, is provided, by means of which the nozzle 6 can be fixed interchangeably to the nozzle holder, not shown, of the machining device 1. In addition, an outer edge 26 of the nozzle 6 can be formed in the manner of a polygon, to offer a possible point of attachment for a tool for loosening or tightening the nozzle 6 on the nozzle holder.

The nozzle openings 20, 23 and the whole of the nozzle channel 5 have circular cross sections. The nozzle opening 20 facing away from the process can have a diameter between 7 and 10 mm, for example, while the nozzle opening 23 facing the process can have a diameter of 0.7 to 3.0 mm, for example. The conical section 21 can extend at an angle of inclination of about 11° with respect to the course of the nozzle channel 5.

Figure 3:
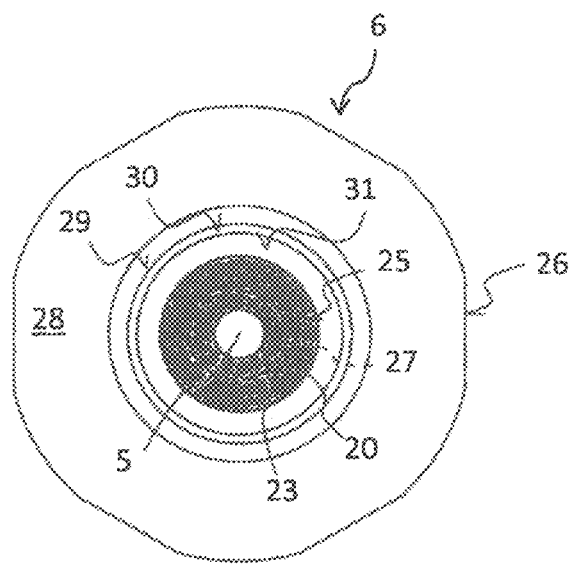
FIG. 3 shows the laser machining nozzle of the laser machining device from FIG. 1 in a plan view of the nozzle opening facing away from the process zone.

In FIG. 3, the nozzle 6 is shown in a plan view of the nozzle opening 20 facing away from the process, parallel to the course of the nozzle channel 5. From this viewing direction, which corresponds to the detection direction of the detection device 10, the contrast section (subarea) 25 completely surrounds the nozzle opening 23 facing the process. The area recorded by the camera 15 is indicated by a dashed circle 27. In this recording area 27, the contrast section (subarea) 25 forms the edge region adjoining the nozzle opening 20 directly.

Incidentally, in FIG. 3, radially from outside to inside, a circumferential outer annular surface 28, two inclined annular surfaces 29, 30 and an annular surface 31 surrounding the nozzle opening 20 facing away from the process can be seen.

Figure 4:
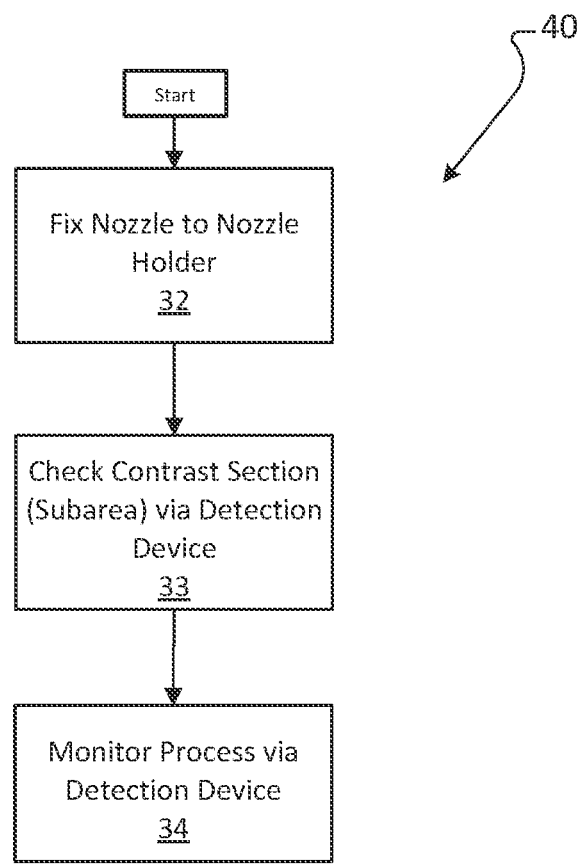
FIG. 4 shows a schematic flowchart of a method for implementing a laser machining nozzle on a laser machining device according to FIG. 1.

FIG. 4 shows the steps of a method 40 for implementing a nozzle 6 on the laser machining device 1. In a first step 32, the nozzle 6 is fixed to the nozzle holder of the laser machining device 1. In a second step 33, the detection device 10 is used to check whether the inner surface of the nozzle 6 has an expected contrast section (subarea) 25. In a third step 34, for the case in which the nozzle 6 has the expected contrast section (subarea) 25, process monitoring using the detection device 10 for the following laser machining with the aid of the checked nozzle 6 is activated or not deactivated. Otherwise, the process monitoring is deactivated or not activated.

For this purpose, the evaluation unit 16 has an activation/deactivation unit 17 indicated in FIG. 1. The process zone 7 is monitored at an observation wavelength between, for example, 300 and 1100 nm. Alternatively or additionally, the laser machining device 1 can comprise a detection device 10 for monitoring at a different observation wavelength between, for example, 900 and 1700 nm. Consequently, the contrast section (subarea) 25 of the nozzle 6 advantageously has an absorbing effect for radiation at least at the respective observation wavelengths.

Optionally, the laser machining device 1 can also have an illuminating apparatus 18, by means of which at least the process zone 7 can be illuminated. FIG. 1 shows an optional illuminating apparatus 18, by means of which the process zone 7 can be illuminated through the nozzle 6. The course of the illuminating light is indicated in FIG. 1 by dashed lines 19. To increase the signal quality of the detection device 10 by the illumination, the illumination should be carried out with radiation at least at a wavelength that corresponds to the observation wavelength of the detection device 10.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A laser machining nozzle for a laser machining device, the laser machining nozzle comprising a body comprising an inner surface and an outer surface,
   wherein the inner surface of the laser machining nozzle comprises at least one contrast section that is directly formed on the inner surface,
   wherein the contrast section directly adjoins a nozzle opening of the laser machining nozzle facing a workpiece, and
   wherein the contrast section comprises a scattering surface structure that has a surface roughness that provides a scattering effect for radiation at an observation wavelength between 300 and 3000 nm.

2. The laser machining nozzle of claim 1, wherein the body comprises copper.

3. The laser machining nozzle of claim 1, wherein the body is a one-piece component.

4. The laser machining nozzle of claim 1, wherein the contrast section surrounds a nozzle opening of the laser machining nozzle.

5. The laser machining nozzle of claim 1, wherein the inner surface area of the nozzle outside the contrast section comprises a smooth metallic surface.

6. The laser machining nozzle of claim 1, wherein the observation wavelength is between 300 and 1100 nm.

7. The laser machining nozzle of claim 1, wherein the observation wavelength is between 900 and 1700 nm.

8. The laser machining nozzle of claim 1, wherein a level of roughness of the scattering surface structure corresponds to at least an order of magnitude of the observation wavelength.

* * * * *